US011596257B1

(12) United States Patent
Kim

(10) Patent No.: US 11,596,257 B1
(45) Date of Patent: Mar. 7, 2023

(54) FRUIT HULL REMOVER

(71) Applicant: Sun Yong Kim, Hayward, CA (US)

(72) Inventor: Sun Yong Kim, Hayward, CA (US)

(\*) Notice: Subject to any disclaimer, the term of this patent is extended or adjusted under 35 U.S.C. 154(b) by 0 days.

(21) Appl. No.: 17/691,501

(22) Filed: Mar. 10, 2022

(51) Int. Cl.
*A47J 21/00* (2006.01)
*A23N 11/00* (2006.01)
*A23N 15/04* (2006.01)

(52) U.S. Cl.
CPC ............... *A47J 21/00* (2013.01); *A23N 11/00* (2013.01); *A23N 15/04* (2013.01)

(58) Field of Classification Search
CPC .. A47J 21/00; A47J 25/00; A47J 43/00; A47J 23/00; A47J 17/00; A23N 15/02; A23N 3/00; A23N 4/12; A01B 1/165; A01B 1/18; A01C 5/02
USPC ................................ 30/113.1, 113.2; 99/544
See application file for complete search history.

(56) References Cited

U.S. PATENT DOCUMENTS

| | | | |
|---|---|---|---|
| 1,448,652 A * | 3/1923 | Anderson | A47J 25/00 30/130 |
| 1,906,419 A * | 5/1933 | Riddell | A47J 25/00 30/301 |
| 2,331,604 A | 7/1942 | Homer et al. | |
| 2,376,135 A | 11/1944 | Frasher | |
| D260,222 S | 8/1981 | Conti | |
| 4,949,459 A | 8/1990 | Noble | |
| 5,092,043 A | 3/1992 | Shirkey | |
| 5,794,344 A | 8/1998 | Poulos et al. | |
| D564,308 S | 3/2008 | Brunner et al. | |
| 8,234,975 B2 | 8/2012 | Holcomb | |
| D693,655 S | 1/2013 | Cotter | |
| 9,193,081 B2 | 11/2015 | Wright | |
| 10,278,530 B1 | 5/2019 | Wright | |
| 10,716,424 B2 | 7/2020 | Munce | |
| 11,154,977 B2 * | 10/2021 | Jackson-Coty | A46B 17/02 |
| 2006/0070241 A1 * | 4/2006 | Miller | A47J 23/00 30/113.1 |
| 2008/0271320 A1 | 11/2008 | Brunner et al. | |
| 2008/0271321 A1 * | 11/2008 | Brunner | A47J 21/00 30/113.1 |
| 2015/0245727 A1 | 9/2015 | Henry et al. | |
| 2015/0313397 A1 * | 11/2015 | Kim | A47J 21/00 30/113.1 |
| 2015/0327432 A1 * | 11/2015 | Kim | A01C 7/002 111/99 |

\* cited by examiner

*Primary Examiner* — Ibrahime A Abraham
*Assistant Examiner* — Spencer H. Kirkwood
(74) *Attorney, Agent, or Firm* — Gerald R. Prettyman

(57) ABSTRACT

A fruit hull remover removes hulls from berries and other fruit with hulls. The fruit hull remover has a handle, an at least one tong, and an at least one prong, all of which are typically curved or round. The handle has a threaded rod between or at the center of the at least one tong to engage and remove a fruit hull. The threaded rod may be recessed from the at least one prong and have a distal unthreaded region, both which reduce entry pressure into the hull and mitigate entry of the threaded region into the fruit meat to increase intact hull removal performance. A hull ejector has an inner ring and an outer ring to slide down from between the prongs to eject the hull, or the hull ejector may have hemi-cylindrical halves to slide down from between the prongs to eject the hull.

17 Claims, 12 Drawing Sheets

165

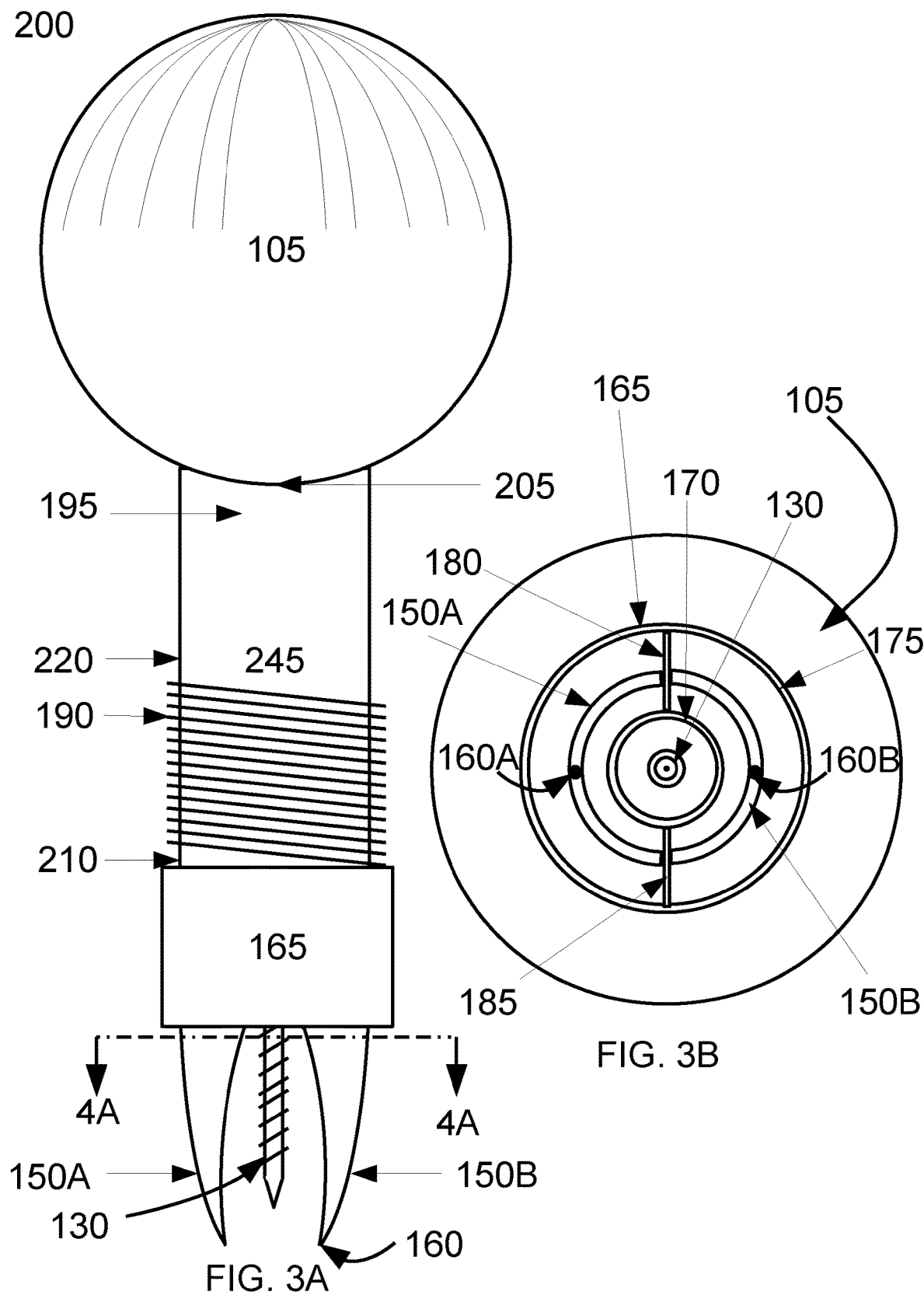

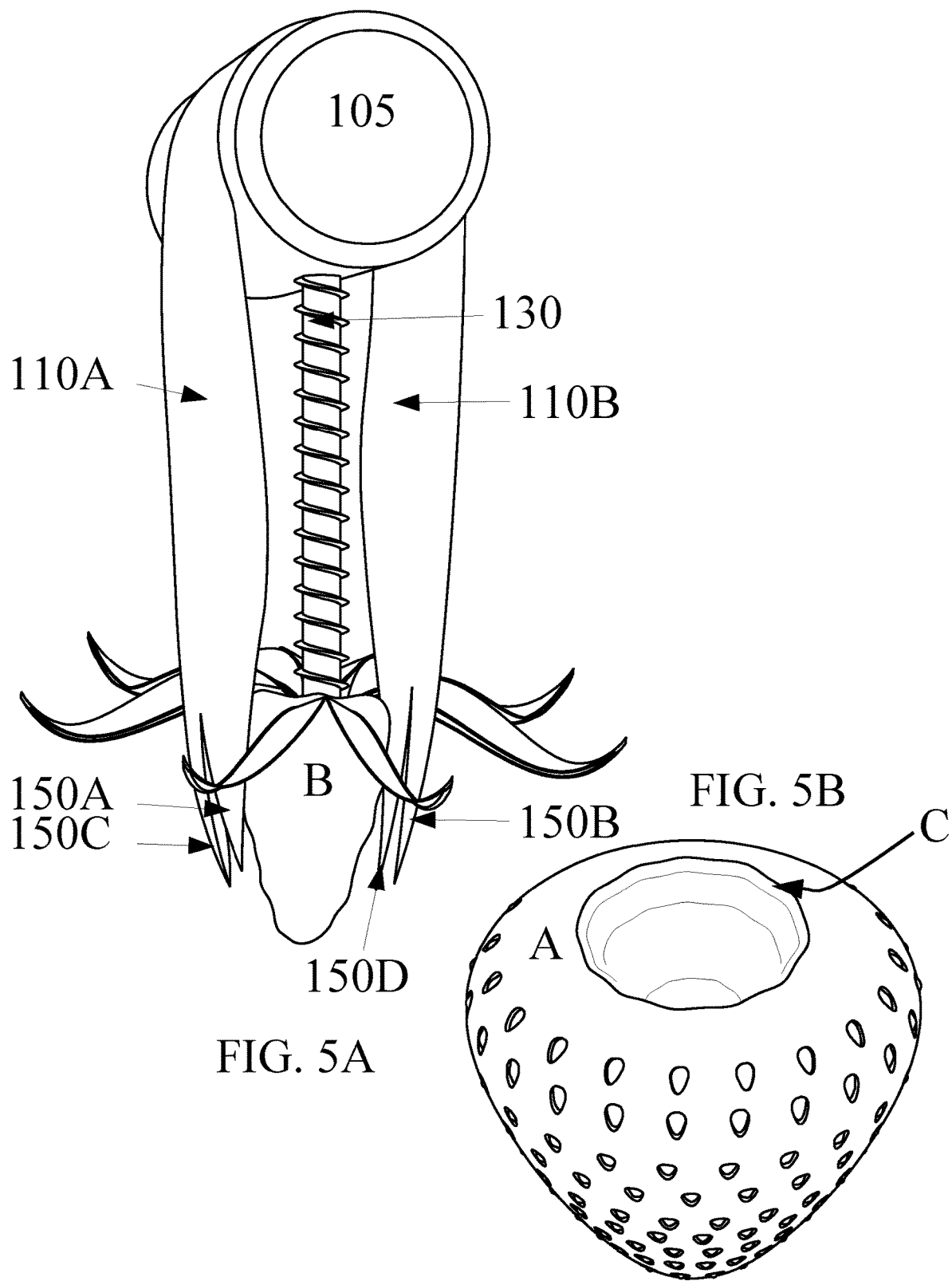

FRUIT HULL REMOVER

CROSS-REFERENCE TO RELATED APPLICATION

None

STATEMENT REGARDING FEDERALLY SPONSORED RESEARCH OR DEVELOPMENT

Not Applicable

BACKGROUND OF THE INVENTION

Field of Invention

The invention relates generally to the field of removing fruit and vegetable processing and more specifically to devices for removing fruit hulls, particularly berry hulls.

Description of Related Art

Whether consumed with dessert, as dessert, as a snack, or for sustenance, fruit have been a valuable food from before recorded history. Accompanying this history for some fruit varieties has been a problem of removing the hull, a portion within a fruit at the top that attaches the fruit meat to the calyx and thus to a stem, and often has a less desirable texture and taste as well as leaves.

FIG. 1 shows a view of an example fruit (A, strawberry) indicating within the berry by broken lines a fruit hull (B), outer surface edge (C) of a fruit hull, and fruit hull center and calyx (D). As shown in FIG. 1, some fruit (A), and particularly some berries, have an inner portion (hull, B) which attaches internally to a softer fruit meat and externally at an outer surface edge (C) of the fruit. At the top center of the fruit hull (B) is a stem, often with a stem tip and a few leaves (calyx, E). When immature, fruit hulls can be quite firm, and firmly attached to the fruit meat, and remain firmer than the fruit meat.

Fruit hulls are often removed to provide for a smooth consistency of processed fruit, and sometimes for fresh consumption. Multiple devices exist for removing fruit hulls. Doing so, however, is a balance of ease of use while minimizing removal of the fruit meat with the hull.

One technique cuts across the fruit below the fruit top, but as shown in FIG. 1, that is also the widest portion of the fruit and thus proportionally cuts off more of the most fruit meat. Cutting lower to remove the entire hull thereby also removes more of the fruit meat and spoils appearance of the fruit.

Some hull removers use a hollow tube to pierce entirely through the fruit. These devices are acceptable for apples, which have a whole-height core, but for fruit with hulls rather than cores, the devices cut out fruit meat below the hull. These devices, in addition, have a fixed diameter and unless matched to the size of the fruit, leave behind some of hull of larger fruit, or cut out proportionally more of the fruit meat of smaller fruit.

Other hull removers use tubular cutting edges to rotate around the hull in an attempt to gouge out the fruit hull. These devices, however, leave behind some of hull of larger fruit, or cut out some of the fruit meat of smaller fruit. Worse, when these devices fail to remove the fruit hull, leaves remain attached to the fruit and require manual processing or the fruit must be discarded.

SUMMARY OF THE INVENTION

Embodiments are directed to fruit hull removers for removing hulls from fruit, such as from kiwi fruit, strawberries, blueberries, raspberries, etc.

The fruit hull removers have a handle (105) for holding of the fruit hull remover for removing a fruit hull, an at least one tong (110) affixed to the handle (105), an at least one prong (150) affixed to the at least one tong (110) with each of the at least one prong (150) configured with a mirror image concavity (120) around a vertical centerline (115) to a size diametrically consistent to the outer surface edge (B) of the fruit hull (B) for cutting a for cutting a fruit hull size-appropriate gap around the outer surface edge (C) of the fruit hull (B) and the fruit hull (B), a vertical rod (130) affixed to a distal end (205) of the handle (105) and projecting along the vertical centerline (115) of the handle (105) to a vertical rod tip (145) of the vertical rod (130).

The vertical rod (130) has a plurality of pitch-directional threads (135) to frictionally engage the fruit hull (B) when the vertical rod (130) is directionally rotated into the fruit hull (B) consistent with the pitch-directional threads.

The at least one tong (110) may be affixed to the handle (105) at a proximal end (200) of the handle.

The at least one tong (110) may be affixed to the handle (105) at a distal end (205) of the handle.

The at least one tong (110) may be a first of an at least one tong (110a) and a second of an at least one tong (110b) affixed to the handle (105) an equidistance from the vertical centerline (115) of the handle (105).

The at least one tong (110) may extend beyond the vertical rod tip (145) of the vertical rod (130).

A first embodiment uses the at least one prong (150) which may be one or more of tapered or flexible to score around and down along the fruit hull when inserted and rotated, along with a vertical rod (130), which has a plurality of pitch-directional threads (135) to frictionally engage the fruit hull. Flexibility and angling of the at least one prong (150) allows the at least one prong (150) to angularly flex to a position under the fruit hull during insertion and rotation. The fruit hull is thus cut free along its demarcation with the fruit meat, with the plurality of pitch-directional threads (135) providing a secure attachment for the fruit hull remover to pull out the hull. The plurality of pitch-directional threads (135) increases intact hull removal performance, which increases meat yield of fruit with tapered hulls, e.g., berries, by closing together to cut under the fruit hull and further decreases removal of fruit/berry meat, which also increases overall yield by eliminating failed fruit hull removal.

The at least one tong (110) may have a tubular configuration (245) with a plurality of the at least one prong (150), each with a prong end (160) which score around and down along the fruit hull when inserted and rotated, along with a plurality of pitch-directional threads which centrally engages into the fruit hull. The fruit hull is thus cut free along its demarcation with the fruit meat, with the plurality of pitch-directional threads (135) engaging the fruit hull to pull out the fruit hull. This embodiment works well with larger fruit hulls, such as kiwi fruit. The prong end (160) may have a round shape.

In some embodiments, the fruit hull remover may have an external hull ejector collar (165) to push the fruit hull from the hull remover. The external hull ejector collar (165) has two concentric rings, an outer prong separating ring (175) which is sized to slide on an outside (210) of the at least one tong (110) and over a first of an at least one prong (150A)

and over a second of an at least one prong (150B), and an inner prong separating ring (170) which is sized to slide non-contactably around the vertical rod (130) and between the first least one prong (150A) and the second at least one prong (150B), and a pair of connecting strips, a first side connecting strip (180) diametically connecting the inner prong separating ring (170) to the outer prong separating ring (175) on a first side, and a second side connecting strip (185) diametically connecting the inner prong separating ring (170) to the outer prong separating ring (175) on a second side, with the first side connecting strip (180) co-linear to the second side connecting strip (185).

Some embodiments may have an internal plunger ejector mechanism (220) which has a plunger ejector handle (225) in the handle (105) and which rises above a proximal end (200) of the handle, and has a plunger ejector pusher (235) within or between the at least one tong (110) such that pressing the plunger ejector handle (225) pushes down the plunger ejector pusher (235) between the at least one prong (150) to eject a fruit hull. A plunger ejector spring (230) and detents (240) around the plunger ejector handle (225) may be within the handle (105) or within or between the at least one tong (110) to raise the plunger ejector handle (225) and plunger ejector pusher (235) up to an un-depressed position.

BRIEF DESCRIPTION OF THE DRAWINGS

FIG. 3A shows a side view of a second embodiment of a fruit hull remover with an external hull ejector collar and an external fruit hull ejection spring.

FIG. 3B shows bottom view of a second embodiment of a fruit hull remover with an external hull ejector collar, and showing curvature of the at least one prong.

FIG. 3) shows a third embodiment of a fruit hull remover with an internal plunger ejector mechanism.

FIG. 5A shows a first embodiment of a fruit hull remover with the plurality of an at least one prong which are flexible, after removal of a strawberry hull.

FIG. 5B shows a strawberry after removal of a strawberry hull with a first embodiment of a fruit hull remover with a threaded vertical rod (103) and a plurality of an at least one prong (150).

DETAILED DESCRIPTION OF THE INVENTION

Figure 1:
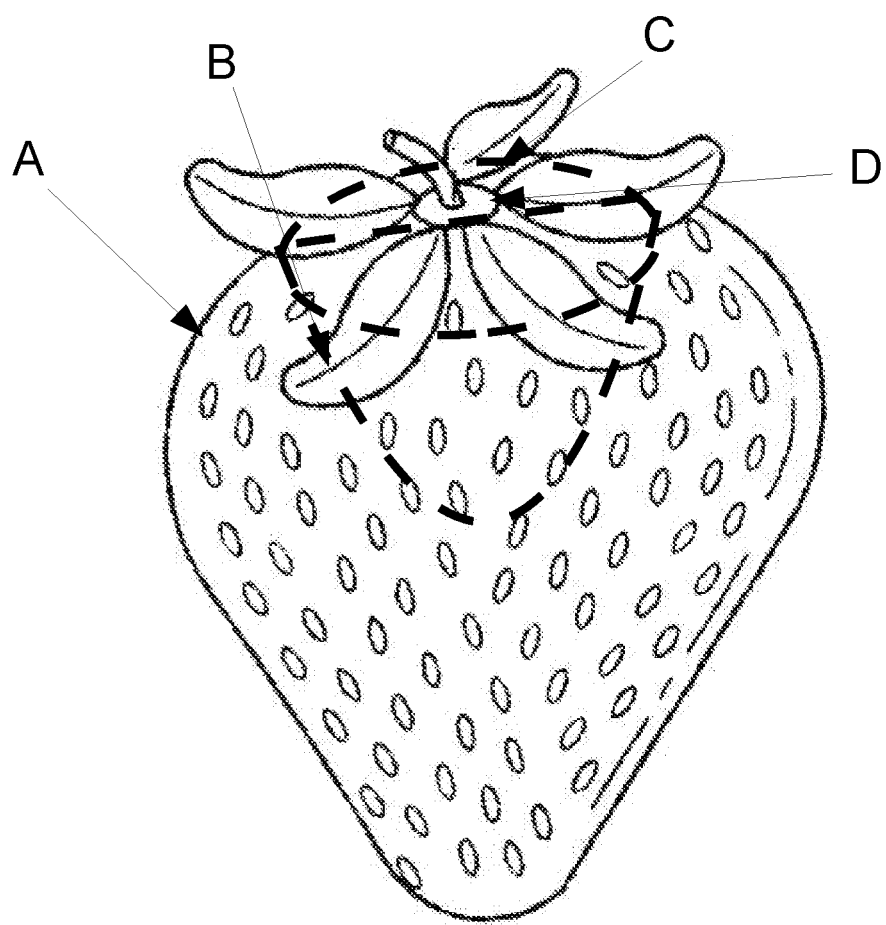
FIG. 1 shows a view of an example fruit (A, strawberry) indicating within the berry by broken lines a fruit hull (B), outer surface edge (C) of a fruit hull, and fruit hull center and calyx (D).
Figure 2A:
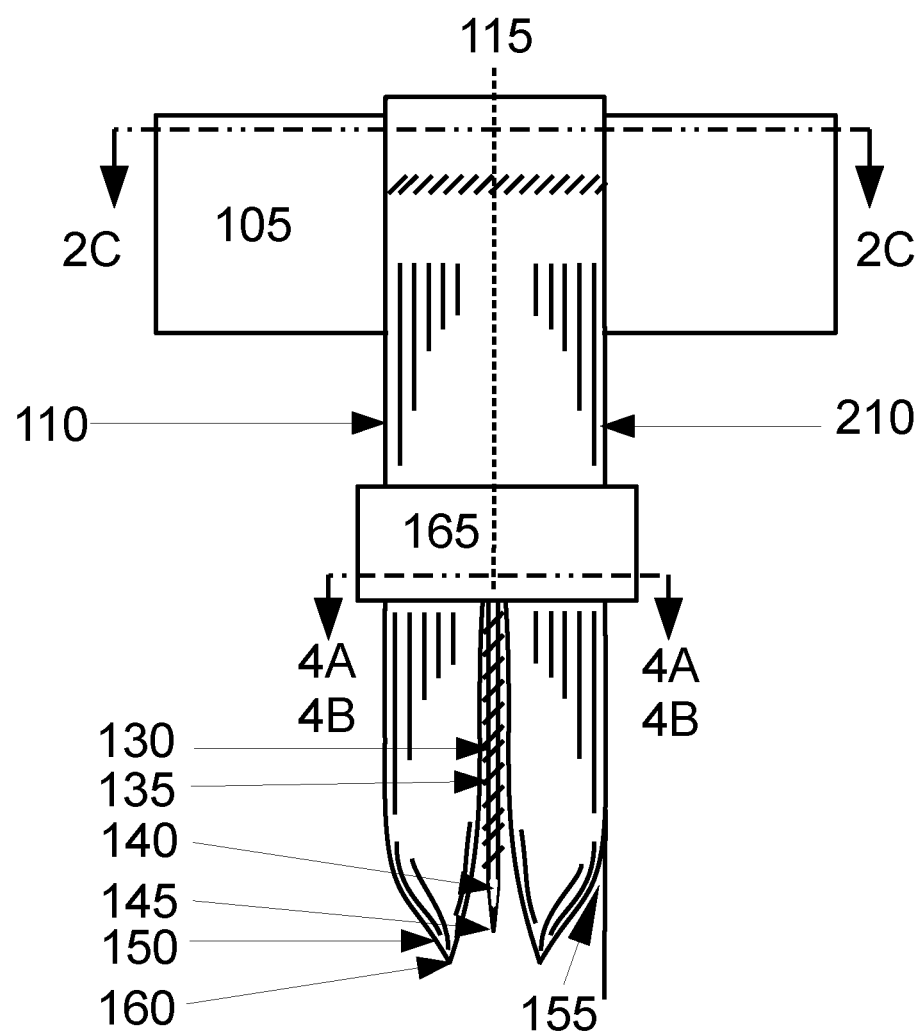
FIG. 2A shows a front/back view of a first embodiment of a fruit hull remover with an external hull ejector collar.

FIG. 2A shows a front/back view of a first embodiment of a fruit hull remover (100) with an external hull ejector collar (165).

Shown in FIG. 2A are a handle (105), an at least one tong (110) affixed to the handle (105), an outside (210) of the at least one tong (110) affixed to the handle (105), an external hull ejector collar (165), a vertical rod (130) having a plurality of pitch-directional threads (135), a distal unthreaded portion (140) of the vertical rod (130) and a vertical rod tip (145), along with an at least one prong (150), and a prong end (160). Some embodiments may have a prong angle (155) between 1 and 40 degrees inclusive angled towards the vertical rod (130) to improve placement of the at least one prong (150) under the fruit hull (B) and cut out less fruit meat when the fruit hull remover for removing a fruit hull is directionally rotated around the fruit hull (B) and intact fruit hull removal performance.

FIG. 2A shows a first embodiment using tapered and flexible prongs. These prongs when inserted and rotated, cut around and down along the fruit hull along with a threaded rod which centrally engages into the fruit hull. The fruit hull is thus cut free along its demarcation with the fruit meat, with the threaded rod providing a secure attachment of the fruit hull to the hull remover to pull out the hull. This embodiment works well with tapered fruit hulls, such as some berries, to improve intact fruit hull removal performance and thus hulled fruit yield.

The handle (105) may have a spherical shape, an oval shape, or be substantially spherical shaped, or substantially oval shaped (keeping in mind that the handle may be modified to attach an at least one tong at a distal end of the handle). The handle (105) have one or more flat sides, or of any suitable shape or configuration for holding the fruit hull remover to insert the fruit hull remover into a fruit hull, rotate the fruit hull remover, and pull a fruit hull from a fruit.

The handle (105) may have a cylindrical shape, or have a substantially cylindrical shaped, and may be aligned perpendicular to a first of an at least one tong (110A) and to a second of an at least one tong (110B).

The handle (105) may be made of plastic, wood, metal, composite, or of any suitable material for holding the fruit hull remover to insert the fruit hull remover into a fruit, rotate the fruit hull remover, and pull a fruit hull from a fruit.

The at least one tong (110) may be made of plastic, wood, metal, composite, or of any suitable material for affixing the at least one tong (110) to the handle (105) to insert the fruit hull remove into a fruit hull, rotate the fruit hull remover, and pull a fruit hull from a fruit.

The at least one prong (150) and prong end (160) may be made of plastic, wood, metal, composite, or of any suitable material for the prong end (160) to cut around the fruit hull and into the fruit when the fruit hull remover is inserted and rotated, and pulled to remove the fruit hull from the fruit. Materials and manufacturing techniques providing flexibility, angling, or both, of the at least one prong, allows the at least one prong to angularly flex to a position under the fruit hull during insertion and rotation. The fruit hull is thus cut free along its demarcation with the fruit meat, with the plurality of pitch-directional threads (135) providing a secure attachment for the hull remover to pull out the hull. This embodiment increases meat yield and fruit yield of fruit with tapered hulls by closing together to cut under the fruit hull.

The at least one tong (110) may be wrapped around the proximal end (200) of a handle (105) and crimped at 90 degrees relative to the handle and formed into a first of an at least one tong (110A) affixed to the handle (105) and a second of an at least one tong (110B). The at least one tong (110) may be fastened to the handle (105) as by screws, bolts, nails, or any other method to secure the at least one tong (110) to the handle (105). The at least one tong (110) may be affixed to the distal end of the handle (105) with fasteners. The at least one tong (110) may be inserted and secured into the handle (105).

The at least one prong (150) may be integrated into the at least one tong (110), as by made from the same piece of material, such as machining a tong or pair or tongs to have one or more prongs at each end. The at least one prong (150) may be may be affixed to the at least one tong (110).

Some embodiments of the hull remover may have one tong with a plurality of prongs. The tong may have from 2 to 8 prongs. Some embodiments of the hull remover may have two tongs, with each tong having from 2 to 8 prongs. Some embodiments of the hull remover may have three or more tongs, with each tong having from 2 to 8 prongs Smaller fruit generally requires fewer and smaller prongs while larger fruit requires more and larger prongs.

In some embodiments each of the at least one prong (150) has a prong end (160) having a prong angle (155) between 1 and 40 degrees inclusive from vertical. While many hull removers have straight prongs cutting around the outer surface edge (c) of the berry hull (B), straight prongs tend to (a) cut more into the fruit meat, and (b) may fail to provide enough friction around the fruit hull to fully remove the fruit hull. Substantial experimentation and testing found that an angular deviation inward toward the vertical centerline (115) would drive the prong end (160) toward the vertical centerline (115) which place the prong end (160) under more of the fruit hull (B). When the fruit hull remover (100) is rotated, the prong ends (160) then cut under the fruit hull (B) rather than just around fruit hull (B) to cut out less of the fruit meat. Then, when the fruit hull remover (100) is pulled out, the fruit hull (B) is thereby grasped underneath by the fruit hull remover (100) and removed with much less chance of partial removal, and with removal of less fruit meat, all of which improves intact hull removal performance to yield better appealing hulled fruit, and thus increases hulled fruit yield.

The prong end (160) may have a round shape. The prong end (160) may have a gently pointed shape. The prong end (160) may have a sharply pointed shape. The prong end (160) may have a triangular shape. The prong end (160) may have any suitable configuration for cutting around the outside edge of a fruit hull (B) and into the fruit and for cutting around the fruit hull.

In some embodiments, the hull remover may have an external hull ejector collar (165) to push off a hull from the hull remover. The external hull ejector collar (165) is shown in detail and discussed in FIG. 2D, 2E, 2F as well as FIG. 3A.

In some embodiments, as shown FIG. 3A, the hull remover may have an external fruit hull ejection spring (190) to enhance operability of the external hull ejector collar (165) to push a hull from the fruit hull remover.

Figure 2B:
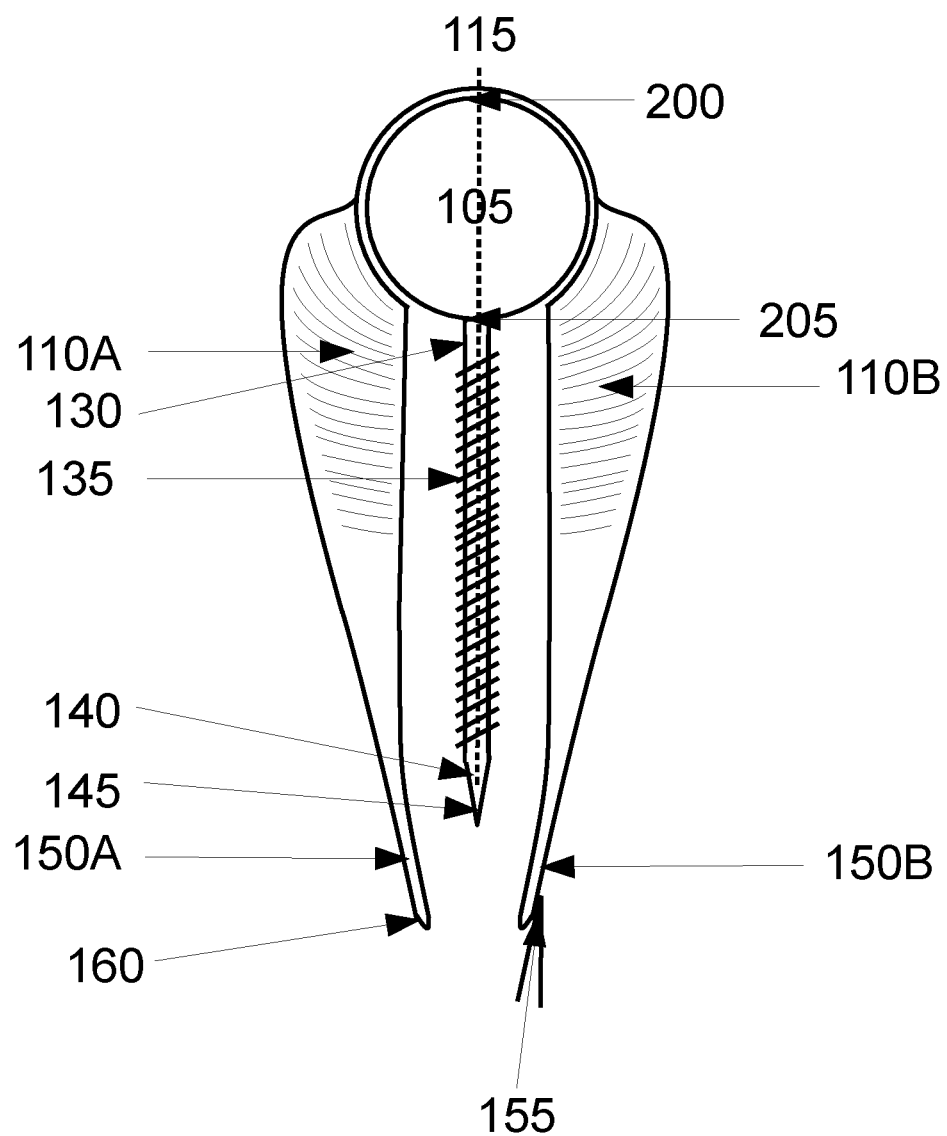
FIG. 2B shows a left/right side view of a first embodiment of a fruit hull remover without an external hull ejector collar.

FIG. 2B shows a left/right side view of a first embodiment of a fruit hull remover without an external hull ejector collar (165).

Shown in FIG. 2B are a handle (105), a proximal end (200) of the handle (105), a distal end (205) of the handle (105), a first of an at least one tong (110A) affixed to the handle (105), a second of an at least one tong (1101B) affixed to the handle (105), a vertical rod (130), a plurality of pitch-directional threads (135), a distal unthreaded portion (140) of the vertical rod (130), a vertical rod tip (145), a first of an at least one prong (150A), a second of an at least one prong (150B), a prong angle (155) between 1 and 40 degrees inclusive, and a prong end (160).

As shown in FIG. 2B in conjunction with FIG. 2A, the handle (105) may be cylindrical, the at least one tong (110) may be curved, with the at least one prong (150) extending beyond the vertical rod (130), and the vertical rod (130) may have a distal unthreaded portion (140) of the vertical rod (130) between the plurality of pitch-directional threads (135) and the vertical rod tip (145).

Initial configurations included corresponding lengths of the at least one tong (110) and the vertical rod (130). Observation indicated that such a configuration would cause the vertical rod (130) to extend deep into the fruit hull. An extended vertical rod (130) could damage the fruit hull, and reduce intact full removal performance. Testing indicated that changing the relative lengths of the at least one tong to extend beyond the vertical rod (130) to a depth needed only for the at least one tong to grasp around the fruit hull and for the plurality of pitch-directional threads (135) to engage the fruit hull through the calyx would increase intact full removal performance.

Some embodiments may have a distal unthreaded portion (140) at the vertical rod tip (145) to improve intact fruit full removal. While developing the size-appropriate proportions for the at least one tong (110) and the vertical rod (130), substantial observation and testing indicated that using a rod threaded to the tip tended to decrease certainty of intact fruit hull (B) removal. Intact fruit hull (B) removal improved with a distal unthreaded portion (140) between the plurality of pitch-directional threads (135) and the vertical rod tip (145) would increase intact full removal performance.

Figure 2C:
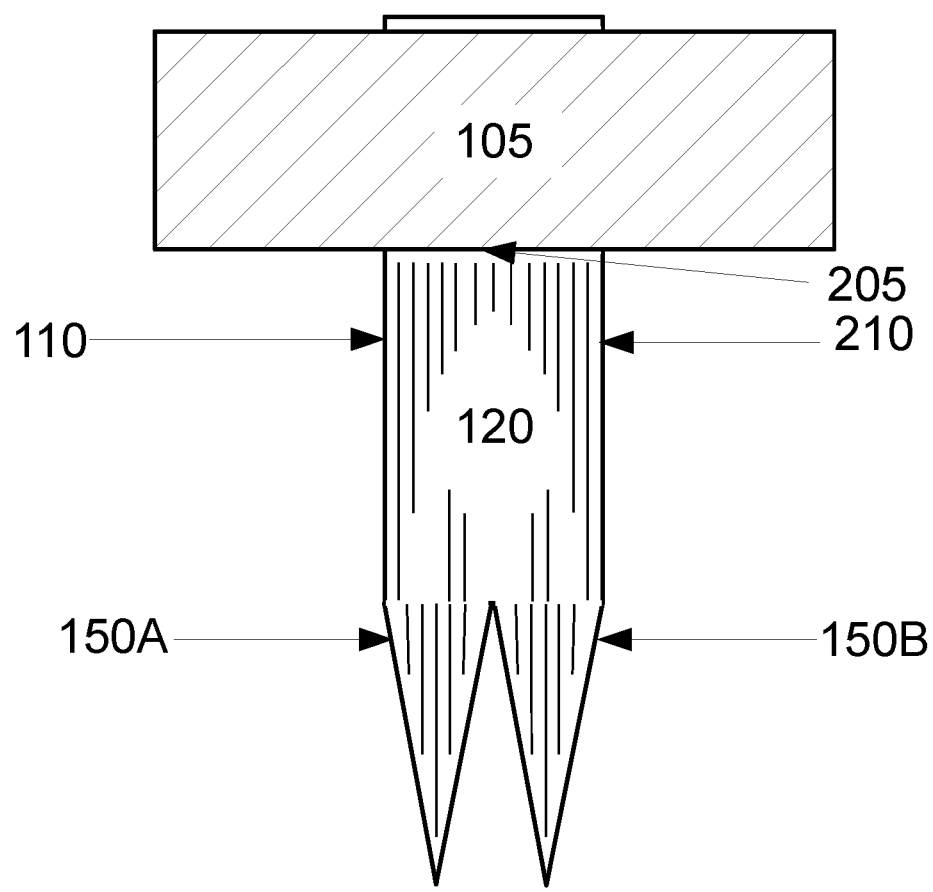
FIG. 2C shows a section view of a first embodiment of a fruit hull remover without an external hull ejector collar or a vertical rod to show curvature of an at least one prong (150).

FIG. 2C shows a section view of a first embodiment of a fruit hull remover without an external hull ejector collar (165) or a vertical rod (130) to show curvature of the at least one prong (150).

Shown in FIG. 2C are a handle (105), a distal end (205) of the handle (105), an at least one tong (110) affixed to the handle (105), a mirror image concavity (120), a first of an at least one prong (150A), and a second of an at least one prong (150B).

The mirror image concavity (120) is used to circularly configure the at least one prong (150) around a vertical centerline (115) to a size diametrically consistent to the outer surface edge (B) of the fruit hull (B) for cutting a fruit hull size-appropriate gap around the outer surface edge (C) and the fruit hull (B). The mirror image concavity (120) may also be used with the at least one tong (110), particularly when the at least one prong (150) is integrated into the at least one tong (110), as when made from the same piece of material.

Figure 2D:
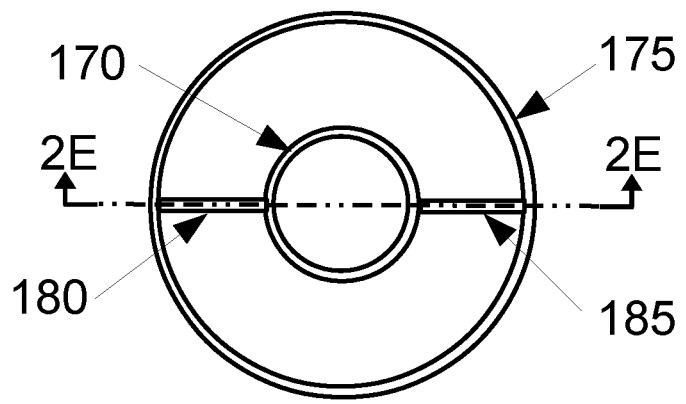
FIG. 2D shows a top/bottom view of a first embodiment of an external hull ejector collar.

FIG. 2D shows a top/bottom view of a first embodiment of an external hull ejector collar (165).

Shown in FIG. 2D are an inner prong separating ring (170), an outer prong separating ring (175), a first side connecting strip (180), and a second side connecting strip (185).

As shown in FIG. 2D, the inner prong separating ring (170) and the outer prong separating ring (175) are concentric to each other, with the first side connecting strip (180), and the second side connecting strip (185) functioning to affix the inner prong separating ring (170) and the outer prong separating ring (175) relative to each other, with the first side connecting strip (180) co-linear to the second side connecting strip (185).

The external hull ejector collar (165) may be made of plastic, wood, metal, composite, or of any suitable material capable of functioning as an external hull ejector collar (165) to eject or otherwise remove a fruit hull from the fruit hull remover.

Figure 2E:
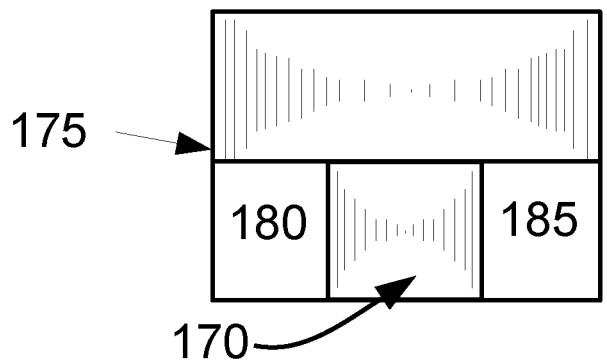
FIG. 2E shows a section view of a first embodiment of an external hull ejector collar.

FIG. 2E shows a section view of a first embodiment of an external hull ejector collar (165). Shown in FIG. 2E are a inner prong separating ring (170), an outer prong separating ring (175), a first side connecting strip (180), and a second side connecting strip (185).

As shown in FIG. 2E, the external hull ejector collar (165) has an upper section of the outer prong separating ring (175) which extends over lower section, within which is the inner prong separating ring (170), with a first side connecting strip (180) diametically connecting the inner prong separating ring (170) to the outer prong separating ring (175) on a first side, and a second side connecting strip (185) diametically connecting the inner prong separating ring (170) to the outer prong separating ring (175) on a second side.

Figure 2F:
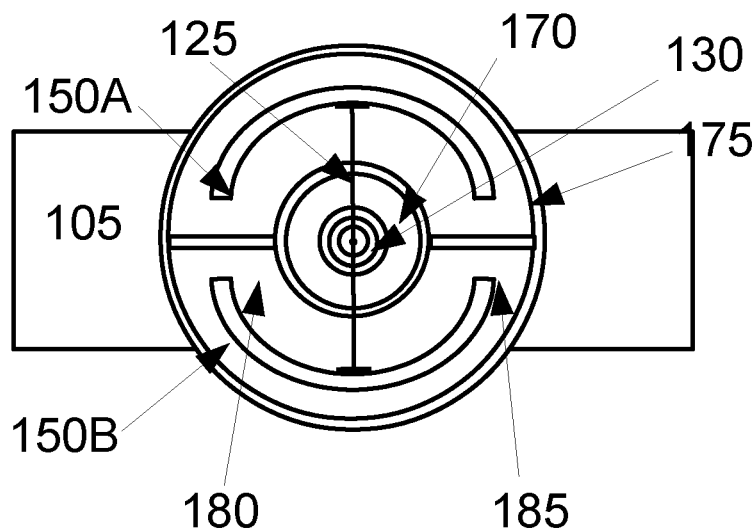
FIG. 2F shows a bottom view of a first embodiment of a fruit hull remover with an external hull ejector collar and showing curvature of the at least one prong.

FIG. 2F shows a bottom view of a first embodiment of a fruit hull remover with an external hull ejector collar (165) and showing curvature of the at least one prong (150).

Shown in FIG. 2F are a handle (105), an at least one tong (110), a vertical rod (130), a first of an at least one prong (150A), and a second of an at least one prong (150B) configured to a diametric distance (125) consistent to the outer surface edge (B) of the fruit hull (B), a inner prong separating ring (170), a outer prong separating ring (175), a first side connecting strip (180), and a second side connecting strip (185).

As shown in FIG. 2F, the outer prong separating ring (175) is outside of the at least one prong (150), i.e., an at least one prong (150A) and an at least one prong (150B), while the inner prong separating ring (170) is inside of the at least one prong (150). Between the at least one prong 150A and the at least one prong (150B) on a first side is a first side connecting strip (180) diametically connecting the inner prong separating ring (170) to the outer prong separating ring (175) on a first side, and between the at least one prong (I 50A) and the at least one prong (I 50B) on a second side is a second side connecting strip (185) diametically connecting the inner prong separating ring (170) to the outer prong separating ring (175), with the first side connecting strip (180) co-linear to the second side connecting strip (185).

Also shown in FIG. 2F are the first of an at least one prong (150A), and a second of an at least one prong (1501B) configured to a diametric distance (125) consistent to the outer surface edge (B) of the fruit hull (B). As explained below, this feature improves intact fruit hull removal performance and reduces unnecessary fruit meat removal.

FIG. 3A shows a side view of a second embodiment of a fruit hull remover with an external hull ejector collar (165) and an external fruit hull ejection spring (190).

Shown in FIG. 3A are a handle (105), a distal end (205) of the handle (105), to which is attached a cylindrical extension (195), on which at a lower end or on the at least one tong (110) is an external fruit hull ejection spring (190), which slides on at least one tong (110), with an external hull ejector collar (165) sliding on an outside (210) of the at least one tong (110), so as to cause the external hull ejector collar (165) to slide down over an at least one prong (150), here, a first of an at least one prong (150A), and a second of an at least one prong (150B), between which is a vertical rod (130), with the first of an at least one prong (150A), and the second of an at least one prong (150B) each having a prong end (160).

The cylindrical extension (195) is affixed at distal end (205) of the handle (105) with the at least one tong (110) affixed at a distal end (250) of the cylindrical extension (195) to provide spacing between the handle (105) and the at least one tong (110), which is within the external fruit hull ejection spring (190) and partially within the external hull ejector collar (165). The cylindrical extension (195) may be integrated into the at least one tong (110), as when made from the same piece of material, such as machining a tong or pair or tongs with a cylindrical extension. The cylindrical extension (195) may be affixed to the at least one tong (110). The cylindrical extension (195) made of plastic, wood, metal, composite, or of any suitable material to function as a cylindrical extension.

In some embodiments, the fruit hull remover may have an external fruit hull ejection spring (190) slideably engaging on the at least one tong (110) and is diametrically sized to engage the outer prong separating ring (175) to aid use of the external hull ejector collar (165) to push off a fruit hull (B) off the vertical rod (130).

In some embodiments, the cylindrical extension (195) and at least one tong (110) may have a reduced height so the at least one prong (150) has a taller height for taller fruit than typical berries, such as kiwi fruit. In this configuration, the external hull ejector collar (165) would be closer to the handle on the fruit hull remover.

FIG. 3B shows bottom view of a second embodiment of a fruit hull remover with an external hull ejector collar (165), and showing the threaded rod (130) and curvature of the at least one prong (150).

Shown in FIG. 3B are a handle (105), and an external hull ejector collar (165), having an inner prong separating ring (170), an outer prong separating ring (175), a first side connecting strip (180), and a second side connecting strip (185), with the first of an at least one prong (150A) and the second of an at least one prong (150B) each having a prong end (160) between the inner prong separating ring (170) and the outer prong separating ring (175), with the first of an at least one prong (150A) and the second of an at least one prong (150B) separated by the first side connecting strip (180) and the second side connecting strip (185), with the first side connecting strip (180) and the second side connecting strip (185) separated by the inner prong separating ring (170), within which is the vertical rod (130).

As shown in FIGS. 2A and 3A, a gap of varying size, as for different size fruit, may exist between the at least one prong (here, 150A and 150B, other prongs may be present). Within this gap, as shown in FIGS. 2F and 3B, are the first side connecting strip (180) and the second side connecting strip (185) of the external hull ejector collar (165). In embodiments for large fruit, the at least one prong (150A, 150B, etc.) may be taller as needed for hulls with longer depths into a fruit. In these embodiments, the cylindrical extension (195), at least one tong (110) and the external fruit hull ejection spring (190), if present may be of less height will the gap between the at least one prong (150A, 150B, etc.) would be taller to accommodate a large fruit hull. The height of the vertical rod tip (145) may also vary for different sized fruits.

Figure 3C:
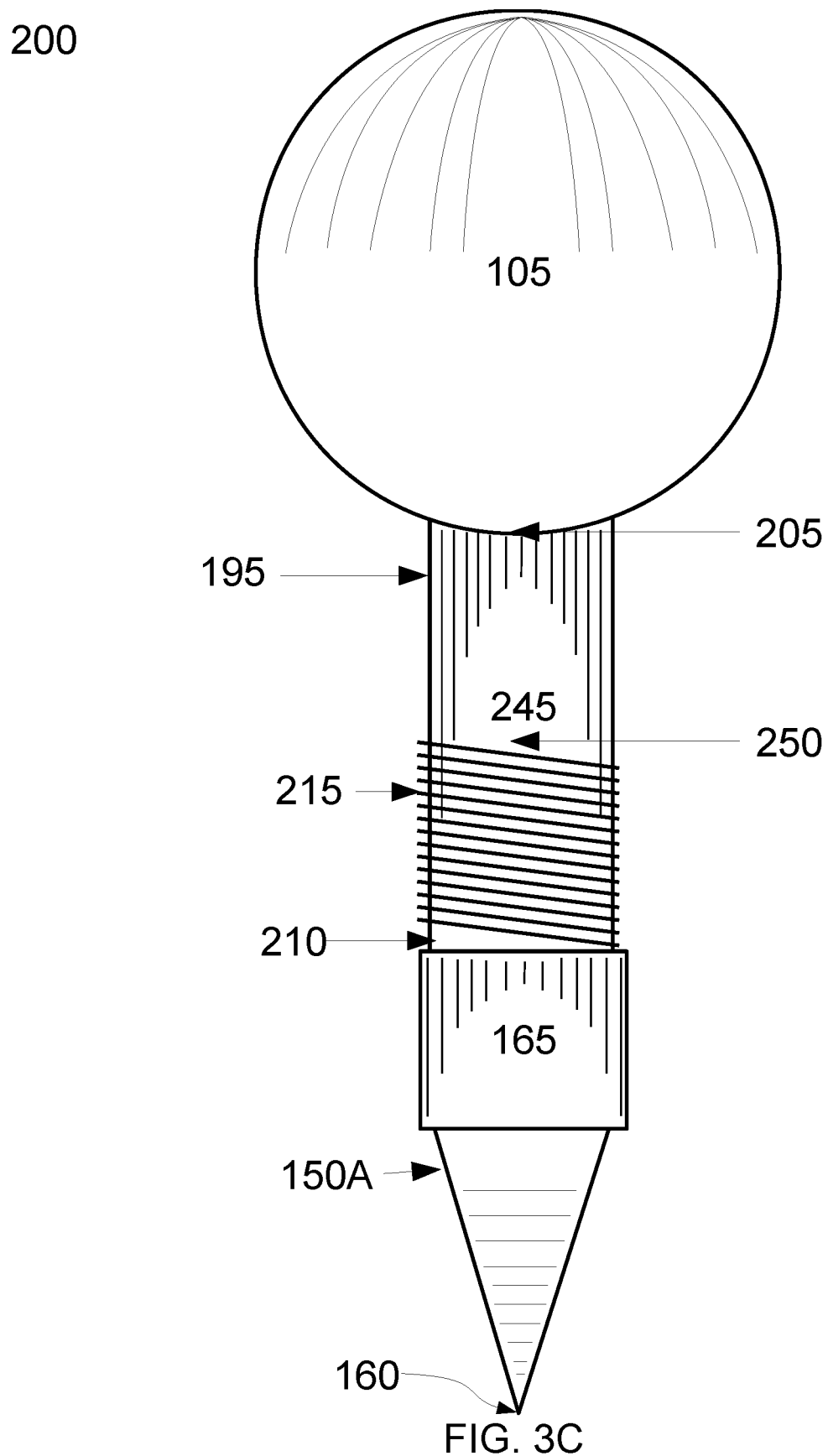
FIG. 3C shows a front/back side view of a second embodiment of a fruit hull remover with a external hull ejector collar and an external fruit hull ejection spring.

FIG. 3C shows a front/back side view of a second embodiment of a fruit hull remover with an external hull ejector collar (165) and an external fruit hull ejection spring (190).

Shown in FIG. 3C are a handle (105), a distal end (205) of the handle (105), to which is connected a cylindrical extension (195), on which at a lower end or below is an ejector spring (215), which slides on the at least one tong (110), with prong end (160), an external hull ejector collar (165) sliding on an outside (210) of the at least one tong (110), so as to cause the external hull ejector collar (165) to slide down an at least one prong (150), here, a first of an at least one prong (150A).

As shown in FIG. 3C, the handle (105) may have a spherical or a substantially spherical configuration. The cylindrical extension (195) may have a tubular configuration (245) as might the external hull ejector collar (165). The at least one prong (150A) may be curved as shown in FIG. 3A, or have a straight configuration, as shown in FIG. 3C. The prong end (160) may be triangular. The prong end (160) may be sharpened. The prong end (160) may have a round shape.

Figures 3D, 3E:
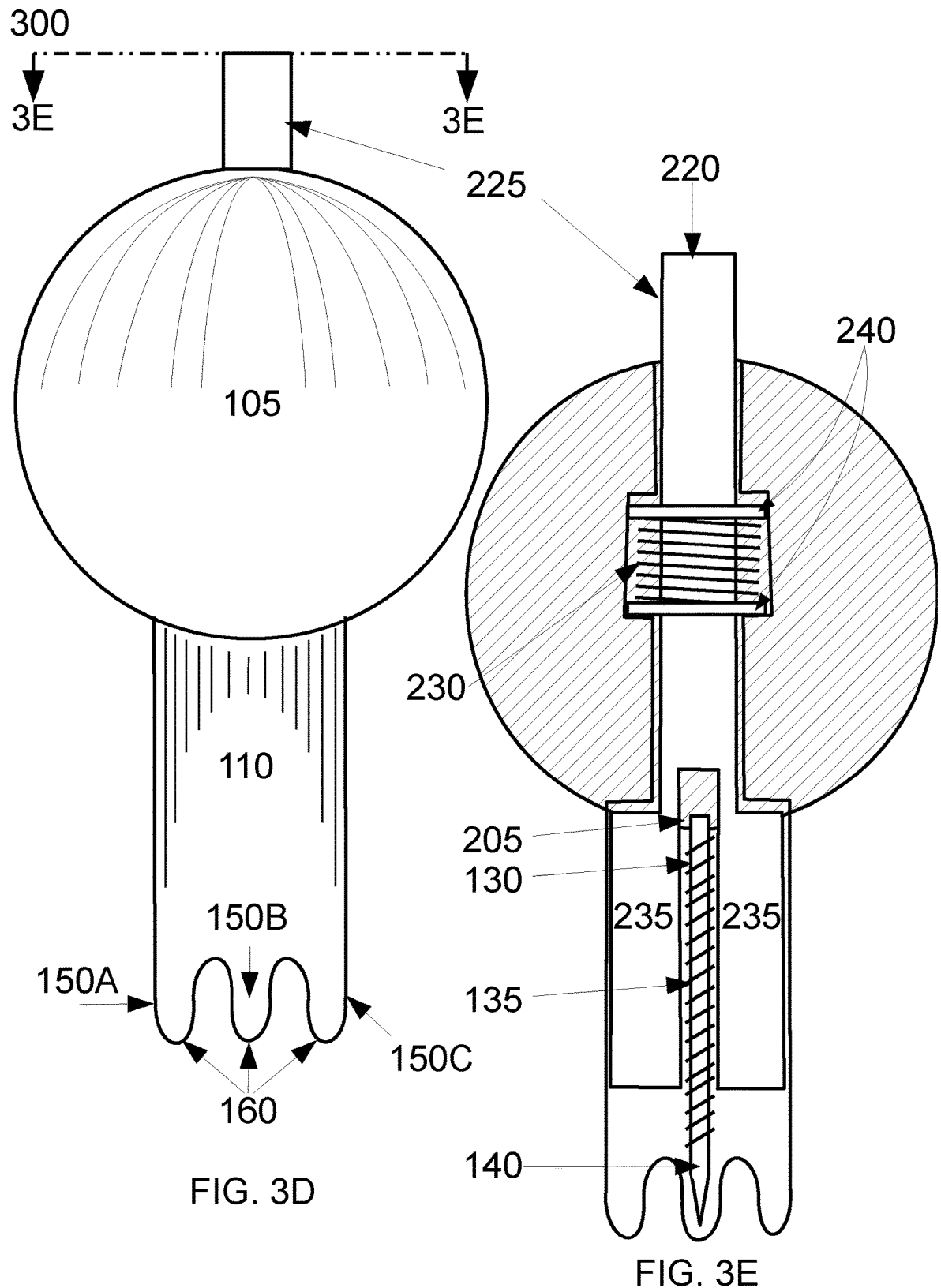
FIG. 3E shows a section view of a third embodiment of a fruit hull remover with an internal plunger hull ejector.

FIG. 3D shows a third embodiment (300) of a fruit hull remover with an internal plunger hull ejector, internal plunger ejector mechanism (220).

FIG. 3D shows a third embodiment (300) using a tubular configuration (245) of the at least one tong (110) with a plurality of the at least one prong (150) which score around and down around the fruit hull when inserted and rotated, along with the plurality of pitch-directional threads (135), shown in FIG. 3E which engages the fruit hull (B). The fruit hull (B) is thus cut free along its demarcation with the fruit meat, with the plurality of pitch-directional threads (135) providing a secure attachment to the fruit hull (B) to pull out the hull. This embodiment works well with larger fruit hulls, such as kiwi fruit.

Shown in FIG. 3D are a handle (105), one of a cylindrical embodiment of an at least one tong (110) affixed to the handle (105), with the at least one tong (110) terminating in a plurality of an at least one prong (150) shown here, a first of an at least one prong (150A), a second of an at least one prong (150B), and a third of an at least one prong (150A).

The handle (105) may be spherical or cylindrical, or have one or more flat sides, or of any suitable configuration for holding the fruit hull remover to insert the fruit hull remover into a fruit hull, rotate the fruit hull remover, and pull a fruit hull from a fruit.

Typical embodiments could have from four to eight of the at least one prong (150A). The prong end (160) may be rounded, gently pointed, sharply pointed, or of any suitable configuration for cutting around the outside edge of a fruit hull (B).

FIG. 3E shows a section view of a third embodiment of a fruit hull remover with an internal plunger hull ejector, internal plunger ejector mechanism (220).

Shown in FIG. 3E within the handle (105) are an internal plunger ejector mechanism (220), having a plunger ejector handle (225), a plunger ejector spring (230), detents (240), and a plunger ejector pusher (235) within the at least one tong (110) for ejecting a fruit hull from the fruit hull remover.

As shown FIG. 3E, the internal plunger ejector mechanism (220) is an internal mechanism. A plunger ejector handle (225) transects the handle (105) with an upper portion projecting above the handle (105). A cavity within the handle (105) contains a plunger ejector spring (230) between an upper detent and a lower detent, which are positioned on the plunger ejector handle (225) to stop downward motion of the plunger ejector pusher (235), and to automatically raise the plunger ejector handle (225) when released.

The components of the internal plunger ejector mechanism (220) may be made any suitably functional material. The plunger ejector handle (225), detents (240) and the plunger ejector pusher (235) may be made of plastic, wood, metal, composite, or of any suitable material, plunger ejector handle (225), detents (240) and the plunger ejector pusher (235) may be made of separate parts affixed together, or made of one integrated part. The plunger ejector spring (230) may be made of metal, plastic, or any elastic material capable of functioning as a plunger ejector spring (230).

Figure 4A:
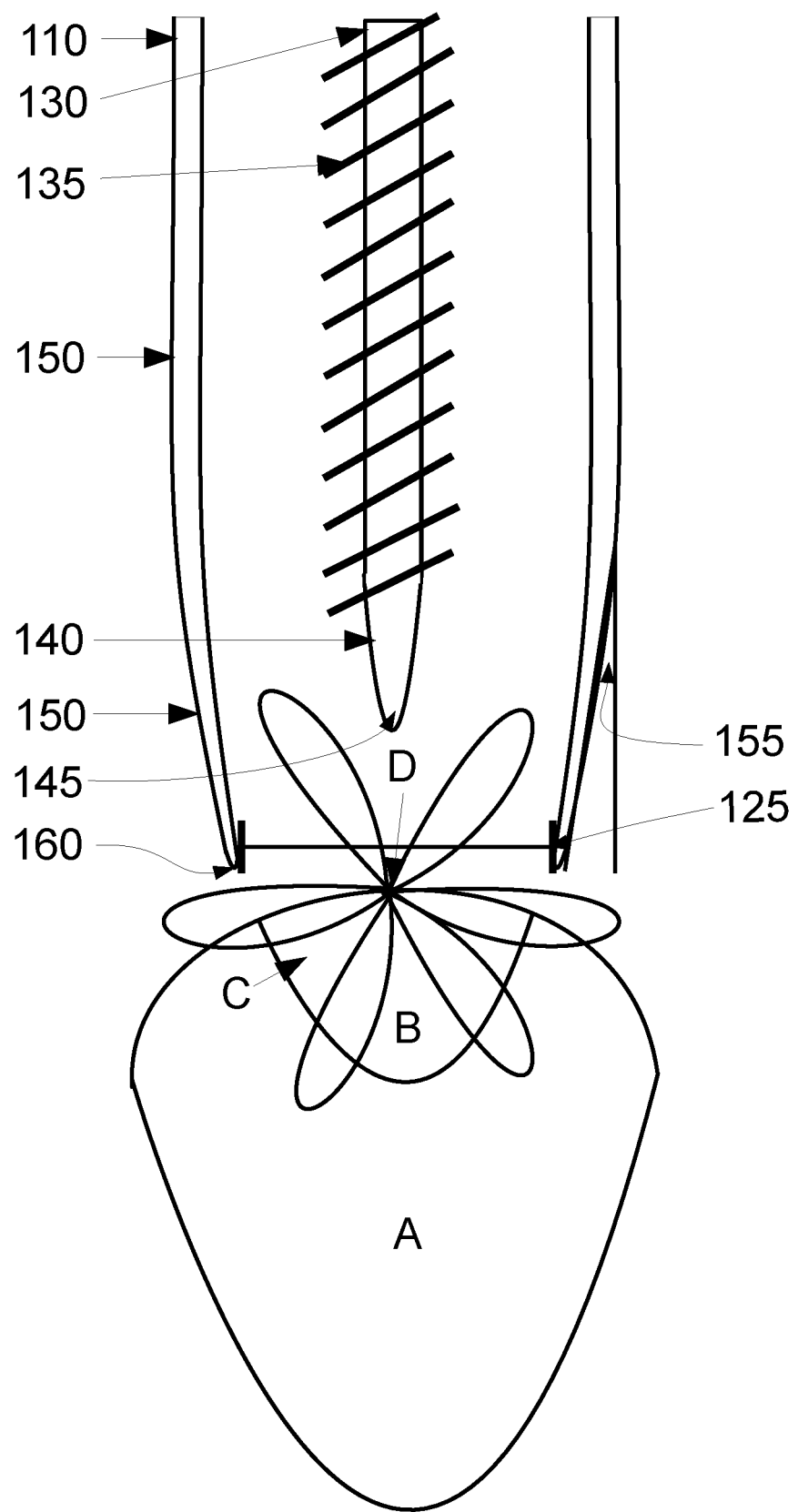
FIG. 4A shows a partial section view of a first embodiment of a fruit hull remover with a plurality of an at least one prong which are flexible and positioned for insertion into a strawberry.

FIG. 4A shows a partial section view of a first embodiment of a fruit hull remover with a plurality of an at least one prong which are flexible and positioned for insertion into a strawberry.

Shown in FIG. 4A are fruit (A), a fruit hull (B) having a fruit hull outer surface edge (C) and a fruit hull center and calyx (D), a vertical rod (130) having a plurality of pitch-directional threads (135), a distal unthreaded portion (140) of the vertical rod (130), and a vertical rod tip (145), an at least one tong (110), an at least one prong (150) with each of the at least one prong (150) having a prong end (160) and having in this embodiment a prong angle (I 55) between 1 and 40 degrees inclusive. In addition, the prong end (160) of the at least one prong (150) may be configured to a diametric distance (125) consistent to the outer surface edge (C) of a fruit hull (B).

As shown in FIG. 4A, the at least one tong (110) terminates with an at least one prong (150) which has a prong end (160). As shown in FIG. 4A, each of the prong end (160) is configures to a diametric distance (125) consistent to the outer surface edge (C) of a fruit hull (B). As discussed above, this diametric distance (125) optimally allows the prong end (160) to enter the fruit at the outer edges of the fruit hull (B). When the fruit hull remover is pulled out, the fruit hull (B) is thereby grasped underneath by the fruit hull remover (100) and removed with much less chance of partial removal, and with removal of less fruit meat, thereby improving intact hull performance.

If though, the diametric distance (125) of the prong end (160) is not same as the diametric distance (125) of the outer surface edge (C) of a fruit hull (B), the prong angle (155) between 1 and 40 degrees inclusive and flexibility of the prong end (160) allows the prong end (160) to enter the fruit (A) and bend toward the proper position. As mentioned above, a fruit hull may be firmer than the fruit meat. If the prong end (160) enters the fruit hull inside of the outer surface edge (C), the firmness of the fruit hull would tend to deflect the prong end (160) toward the outer edge from the fruit hull (B). See e.g., FIG. 5A.

In some embodiments each of the at least one prong (150) has a prong end (160) having a prong angle (155) between 1 and 40 degrees inclusive from vertical. If the prong end (160) enters the fruit hull outside of the outer surface edge (C), the already present angular deflection and flexibility of the at least one prong (150) and prong end (160) would tend to deflect the prong end (160) toward the fruit hull (B). In both instances, the fruit hull removal would improve intact fruit hull removal performance.

As shown in FIG. 4A, the at least one tong (110) may extend beyond the vertical rod tip (145) of the vertical rod (130), and the vertical rod (130) has a distal unthreaded portion (140) of the vertical rod (130).

As mentioned above, the vertical rod (130) serves to engage the fruit hull (B) below the fruit hull center and calyx (D). By positioning the vertical rod tip (145) higher than the at least one tong (110), the plurality of pitch-directional threads (135) of the vertical rod (130) are mitigated beyond the fruit hull, i.e., from entering the fruit meat, which could remove fruit meat, as well as decreasing intact hull removal performance. In addition, the distal unthreaded portion (140) of the vertical rod (130) serves to mitigate insertion pressure on the fruit hull (B) and reduce risks of the vertical rod (130) damaging the fruit hull, would diminish intact fruit hull removal performance.

FIG. 413 shows a partial section view of a first embodiment of a fruit hull remover with a plurality of an at least one prong which are flexible and inserted into a strawberry.

Figure 4B:
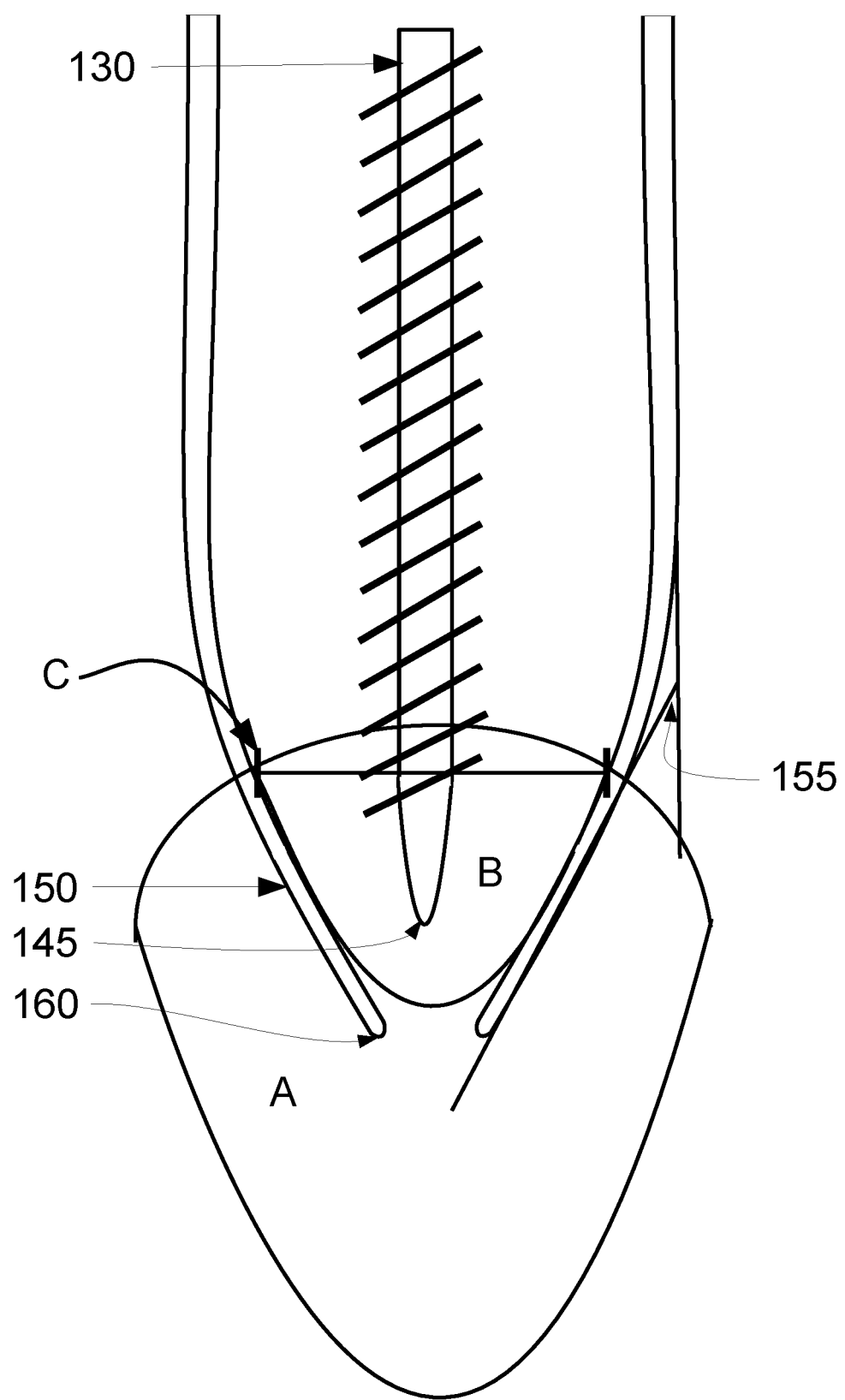
FIG. 4B shows a partial section view of a first embodiment of a fruit hull remover with a plurality of an at least one prong which are flexible and inserted into a strawberry.
Figure 6A:
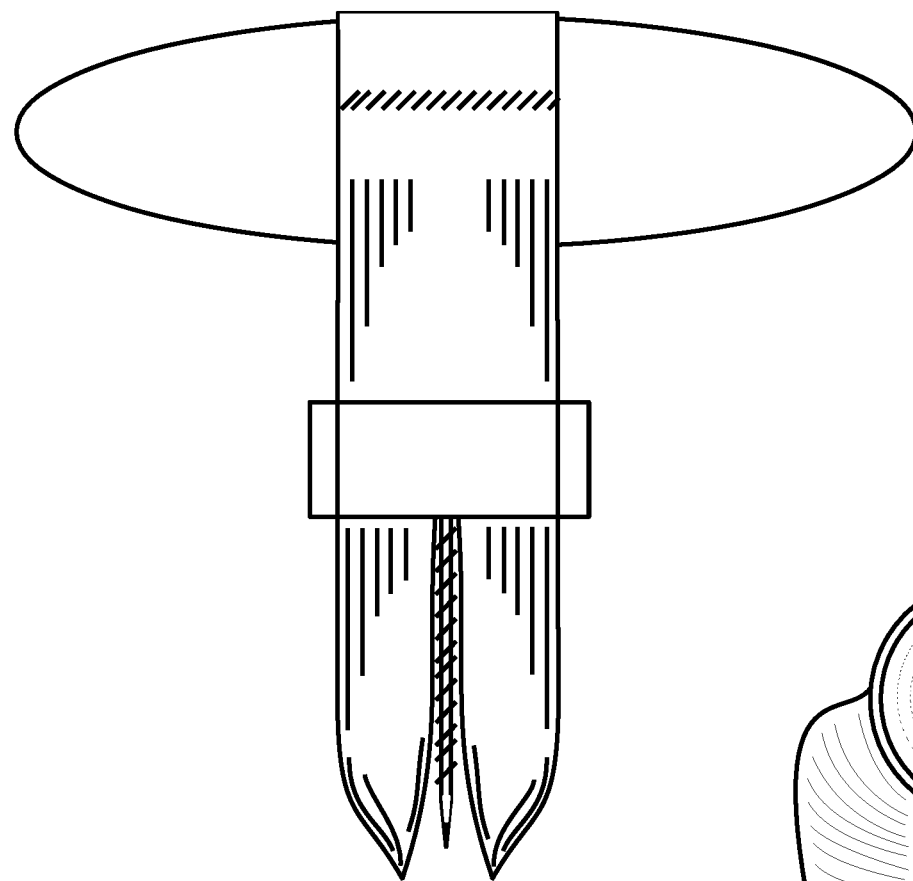
FIGS. 6A and 6B show an embodiment having an oval handle.
Figure 6B:
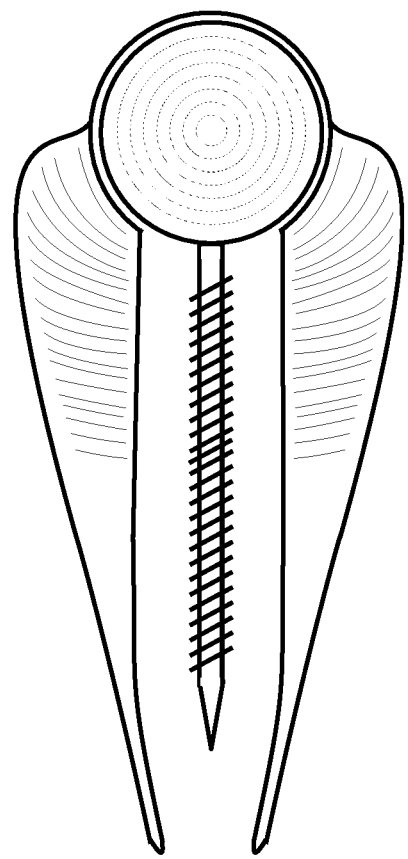

Shown in FIG. 4B are a fruit (A, strawberry) with a fruit hull (B) having a outer surface edge (C) and the vertical rod (130) inserted into the fruit hull (B) with the prong end (160) inserted the fruit (A) and showing the prong end (160) flexed inward (shown by prong angle 155) along the fruit hull margins.

As shown in FIG. 4B, the prong end (160) of the at least one prong (150) have followed along the fruit hull resulting in a larger prong angle (155). In addition, the vertical rod (130) has entered the fruit hull (B), with the distal unthreaded portion (140) of the vertical rod (130) in the fruit hull (B) and some of the plurality of pitch-directional threads (135) frictionally engaging the fruit hull (B) to improve intact fruit full removal performance.

FIG. 5A shows a first embodiment of a fruit hull remover with the plurality of an at least one prong which are flexible, after removal of a strawberry hull.

Shown in FIG. 5A are a handle (105), a vertical rod (130) an at least one tong (110), and a fruit hull (B) with the vertical rod (130) engaged within the fruit hull (B) and the at least one prong (150) outside the fruit hull after removal of the fruit hull (B) from the fruit.

As shown in FIG. 5A, the vertical rod (130) entered the fruit hull (B) and remained in place after removal of the fruit hull (B). The at least one prong (150), which flexed under the fruit hull during insertion, are now removed the fruit, and have returned to the unflexed position. In this example, the at least one prong (150) may have not been inserted the full depth of the fruit hull, yet the fruit hull remover was able to achieve intact fruit full removal performance—an often difficult feat without cutting off the top of the fruit. In addition the fruit hull (B) is intact and with clean lines.

FIG. 5B shows a strawberry after removal of the fruit hull with a first embodiment of a fruit hull remover with a threaded vertical rod (103) and a plurality of an at least one prong (150).

Shown in FIG. 5B are a fruit (A, strawberry) and a outer surface edge (C) of a fruit hull, along with a cavity after removal of the fruit hull.

As shown in FIG. 5B, the fruit (A) in intact—the top has not been cut off, the fruit has not been wholly perforated, and the cavity after removal of the fruit hull has clean lines. This fruit is ready for commercial use, for sale as a hulled berry—and for dipping, and eating.

These descriptions and drawings are example embodiments and teachings. All variations are within the spirit and scope of the embodiments and teachings and are not to be considered as limiting the claims to only the illustrated or discussed embodiments. Certain changes can be made in the subject matter without departing from the spirit and the scope of the embodiments and teachings. It is realized that changes are possible within the scope of this invention and it is further intended that each structure or element recited in any of the claims is to be understood as referring to all equivalent structure or elements. The following claims are intended to cover the invention as broadly as possible in whatever form it may be used.

I claim:

1. A fruit hull remover for removing a fruit hull (B) from a fruit (A), the fruit hull (B) having an outer surface edge (C), a fruit hull center and calyx (D), comprising:
   a handle (105) for holding the fruit hull remover for removing a fruit hull,
   an at least one tong (110) affixed to the handle (105),
   an at least one prong (150) affixed to the at least one tong (110) with the at least one tong (110) configured with a mirror image concavity (120) around a vertical centerline (115) with an at least one prong (150) with the at least one prong (150) having a prong end (160) configured to a diametric distance (125) consistent to the outer surface edge (C) of the fruit hull (B) to improve intact fruit hull removal performance,
   a vertical rod (130) affixed to a distal end (205) of the handle (105) and projecting along the vertical centerline (115) of the handle (105) to a vertical rod tip (145) of the vertical rod (130), wherein the vertical rod (130) above the vertical rod tip (145) is consisting of a plurality of external pitch-directional threads (135) to engage the fruit hull through the calyx for frictionally engaging into the fruit hull (B) to improve intact fruit hull removal performance of the at least one prong (150), and
   the at least one tong (110) and the vertical rod (130) are vertically fixed relative to each other so the least one tong (110) extends beyond the vertical rod tip (145) of the vertical rod (130) to mitigate entry of the plurality of pitch-directional threads (135) beyond the fruit hull.

2. The fruit hull remover of claim 1 wherein the at least one tong (110) is affixed to the handle (105) at a proximal end (200) of the handle.

3. The fruit hull remover of claim 2 wherein the at least one tong (110) comprises a first of the at least one tong (110A) and a second of the at least one tong (110B) affixed to the handle (105) and which are equidistance from the vertical centerline (115) of the handle (105).

4. The fruit hull remover of claim 3 wherein the at least one prong end (160) comprises a prong angle (155) between 1 and 40 degrees inclusive angled towards the vertical rod (130) to improve placement of the at least one prong (150) under the fruit hull (B) during insertion and rotation into the fruit to improve intact fruit hull removal performance.

5. The fruit hull remover of claim 3 wherein the handle (105) comprises a cylindrical shape aligned perpendicular to the first of the at least one tong (110A) and to the second of the at least one tong (110B).

6. The fruit hull remover of claim 3 wherein the first of the at least one tong and the second of the at least one tong are crimped to the handle (105).

7. The fruit hull remover of claim 1 wherein the vertical rod (130) further comprises a distal unthreaded portion (140) between the plurality of pitch-directional threads (135) and the vertical rod tip (145) to improve intact fruit full removal, wherein the distal unthreaded portion (140) comprises solely the vertical rod tip (145) with no sharpened teeth to mitigate insertion pressure on the fruit hull (B) and reduce risk of the vertical rod (130) damaging the fruit hull.

8. The fruit hull remover of claim 1 further comprising:
a cylindrical extension (195) affixed at the distal end (205) of the handle (105) with the at least one tong (110) affixed at a distal end (250) of the cylindrical extension (195).

9. The fruit hull remover of claim 1 wherein the at least one tong (110) is affixed to the handle (105) at a distal end (205) of the handle.

10. The fruit hull remover of claim 9 wherein the at least one tong (110) comprises a tubular configuration (245) with a plurality of prongs (150).

11. The fruit hull remover of claim 10 further comprising an internal plunger ejector mechanism (220) comprising a plunger ejector handle (225) projecting above a proximal end (200) of the handle (105) and into the handle and through a plunger ejector spring (230) within the handle to a plunger ejector pusher (235) for ejecting a fruit hull from the fruit hull remover with the plunger ejector spring (230) within the handle for retracting the plunger ejector pusher (235).

12. The fruit hull remover of claim 1 wherein the handle (105) comprises a spherical shape.

13. The fruit hull remover of claim 1 wherein the handle (105) comprises an oval shape.

14. The fruit hull remover of claim 1 further comprising an external hull ejector collar (165) comprising:
an outer prong separating ring (175) slidably sized on an outside (210) of the at least one tong (110) and over a first of the at least one prong (150A) and a second of the at least one prong (150B),
an inner prong separating ring (170) sized to slide non-contactably around the vertical rod (130) and between the first of the at least one tong (110A) and the second of the at least one tong (110B), with
a first side connecting strip (180) diametically connecting the inner prong separating ring (170) to the outer prong separating ring (175) on a first side,
a second side connecting strip (185) diametically connecting the inner prong separating ring (170) to the outer prong separating ring (175) on a second side, with
the first side connecting strip (180) co-linear to the second side connecting strip (185).

15. The fruit hull remover of claim 14, further comprising:
an external fruit hull ejection spring (190) slideably engaging on the at least one tong (110) and diametrically sized to engage the external hull ejector collar (165) to push a fruit hull (B) off the vertical rod (130).

16. The fruit hull remover of claim 1 wherein the prong end (160) comprises a triangular shape.

17. The fruit hull remover of claim 1 wherein the prong end (160) comprises a round shape.

\* \* \* \* \*